(12) United States Patent
Lee

(10) Patent No.: US 7,796,628 B2
(45) Date of Patent: Sep. 14, 2010

(54) EXPANDABLE EXCHANGE APPARATUS AND A BACKUP SYSTEM THEREOF

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 943 days.

(21) Appl. No.: 11/639,911

(22) Filed: Dec. 14, 2006

(65) Prior Publication Data
US 2008/0148093 A1 Jun. 19, 2008

(51) Int. Cl.
*H04L 12/28* (2006.01)
(52) U.S. Cl. .................. 370/419; 370/217; 370/219; 370/220
(58) Field of Classification Search ............... None
See application file for complete search history.

(56) References Cited

U.S. PATENT DOCUMENTS

| | | | | |
|---|---|---|---|---|
| 5,495,474 | A * | 2/1996 | Olnowich et al. | 370/359 |
| 6,567,403 | B1 * | 5/2003 | Congdon et al. | 370/389 |
| 7,280,547 | B2 * | 10/2007 | Featherston et al. | 370/401 |
| 2004/0153701 | A1 * | 8/2004 | Pickell | 714/4 |
| 2006/0013212 | A1 * | 1/2006 | Singh et al. | 370/389 |
| 2006/0028993 | A1 * | 2/2006 | Yang et al. | 370/250 |
| 2006/0209676 | A1 * | 9/2006 | Chen | 370/216 |
| 2006/0209680 | A1 * | 9/2006 | Lee | 370/217 |
| 2007/0162612 | A1 * | 7/2007 | Paggen | 709/238 |
| 2008/0155146 | A1 * | 6/2008 | Christensen | 710/104 |

\* cited by examiner

*Primary Examiner*—Jayanti K Patel
*Assistant Examiner*—Anthony Sol
(74) *Attorney, Agent, or Firm*—Peter F. Corless; Steven M. Jensen; Edwards Angell Palmer & Dodge LLP

(57) ABSTRACT

An expandable exchange apparatus and a backup system thereof are disclosed. The expandable exchange apparatus is applicable to a plurality of terminal devices in a local area network (LAN). The expandable exchange apparatus includes a signal exchange unit having a network connection port and a plurality of terminal connection ports connectable to the terminal devices, a connection unit connecting the LAN to an external network architecture, and a first exchanger connected to the network connection port and the connection unit, the first exchanger selectively connectable to a terminal device that is connected to none of the network connection port and terminal connection ports of the signal exchange unit, wherein, detects whether the network connection port is connected with the terminal device or not, and based on a detected result, correspondingly switches a data transmission path of the network connection port either to the LAN or to the network architecture.

4 Claims, 2 Drawing Sheets

EXPANDABLE EXCHANGE APPARATUS AND A BACKUP SYSTEM THEREOF

BACKGROUND OF THE INVENTION

1. Field of the Invention

This invention relates generally to exchange apparatuses, and more particularly, to an expandable exchange apparatus and a backup system thereof, which is applicable to a network architecture.

2. Description of Related Art

Along with the advanced network technology and the fact that the electronic data processing device gets popular, network has become an essential part of our daily life for sending and receiving information. Everywhere in the world including the government bureaus, enterprises, schools and even households, in the pursuing of higher information transmission efficiency, it is getting popular for the users to take the use of network to deliver information.

In order to provide more terminal device users to efficiently share network bandwidth, a switch hub (or in short, switch), which is an improved traditional Hub, was made out. Switch and hub hold the same task in the network business, the major different between them is that each port of a switch has its own specific bandwidth and is individually capable of data exchange, however, all the ports of a hub share the same bandwidth, therefore, the switch has greater data transmission amount than the hub in the network transmission within the same time period.

Specifically, switch is applied to connect the physical sections of network in order to interconnect the data of the sections. The switch operates on a layer 2 of an open system interconnection (OSI) model, and according to the address of the layer 2 to direct traffic, for example, the Ethernet media access control (MAC) address. Some other switches also provide other functions, for example, virtual area network and the layer 3 switch function, etc. The switch can automatically setup and detect the traffic flow of each connection port of Ethernet, and obtain the information of the connection situation of the terminal devices that connect to the connection port. Next, the switch directly transmits traffic to the target connection port. The switch flow is following the processing speed of the hardware, effectively without delay.

The connection ports of the switch from the prior art, which connect to the terminal devices, are all based on manufacture specification number. For example, manufacturer fabricates switch with twelve connection ports, one of the twelve connection ports must be used to connect with network (e.g. Ethernet) in order to provide the terminal devices that are connecting to the switch with the capability of connecting with other far end terminal devices via the network, and the remaining eleven connection ports can provide only eleven terminal devices, e.g. servers, for connection. In fact, for the purpose of minimizing size, current server is mostly assembled inside a single machine box in blade server mode, and currently, a single machine box can hold twelve blade servers. Therefore, if a single server machine box with twelve blade servers corresponds to a switch with twelve connection ports, one of the blade server can not connect to the network since one of the connection ports is used to connect with the network, unless add in a second switch. However, there is only one connection port needed for the one remaining blade server and another one connection port for connecting to the network, there will be ten connection port wasted after adding in a second switch.

Hence, it is a highly urgent issue in the industry for how to provide an expandable switch or exchange apparatus.

SUMMARY OF THE INVENTION

In views of the disadvantages of the prior art mentioned above, it is a primary objective of the present invention to provide an expandable exchange apparatus, and the connection ports provided by the exchange apparatus can support all the blade servers inside a server machine box to connect to external network.

It is another objective of the present invention to provide a backup system of the expandable exchange apparatus, at the time that a main exchange apparatus has a breakdown, notify a normal operation backup exchange apparatus to take over the tasks of the main exchange apparatus.

To achieve the above-mentioned and other objectives, an expandable exchange apparatus and its backup system is provided according to the present invention. The expandable exchange apparatus is applicable to a plurality of terminal devices of a local area network, the expandable exchange apparatus comprises: a signal exchange unit, which has a plurality of connection ports, one of the connection ports is the connection port that is for the local area network to make external connection, the remaining connection ports individually and separately connects to the plurality of terminal devices; a connection unit, which connects the local area network with an external network architecture; and a first exchanger, which connects to the connection port that is one of the plurality of connection ports provided by the signal exchange unit for the local area network to make external connection, the first exchanger also connects with the connection unit, and the first exchanger can selectively connect with a terminal device that is not connecting to the connection port of the signal exchange unit, wherein detects whether the connection port that is for the local area network to make external connection is connecting with the terminal device or not, and based on the detected result, correspondingly switches the data transmission path of the connection port that is for the local area network to make external connection to either internal local area network or external network architecture.

The backup system of the expandable exchange apparatus according to the present invention is applicable to a plurality of terminal devices of a local area network, and each of the plurality of terminal devices in the local area network individually has a main connection port and a backup connection port, the backup system comprises: a first exchange apparatus, which serves as a main exchange apparatus, the first exchange apparatus further consists of a signal exchange unit, a connection unit, a first exchanger, a second exchanger, and a third exchanger, the signal exchange unit has a plurality of connection ports, one of the connection ports serves as the connection port for the local area network to make external connection, and one of the connection ports is connecting to the second exchanger, the rest of the connection ports individually and separately connects to the main connection ports of the plurality of terminal devices; the connection unit, which connects the local area network with an external network architecture; and the first exchanger connects to the main connection port of a terminal device that is not connecting to the connection port of the signal exchange unit; a second exchange apparatus, which servers as a backup exchange apparatus, the second exchange apparatus further consists of a signal exchange unit, a connection unit, a first exchanger, a second exchanger, and a third exchanger, the signal exchange unit of the second exchange apparatus has a plurality of connection ports, one of the connection ports serves as the connection port for the local area network to make external connection, and one of the connection ports connects to the second exchanger of the second exchange apparatus, and the rest of the connection ports individually and separately connects to the backup connection ports of the plurality of terminal devices; the connection unit is for the local area network to connect with an external network architecture; the first exchanger connects to the backup connection port of a terminal device that is not connecting to the connection port of the signal exchange unit of the same exchange apparatus; wherein, the second exchanger of the first exchange apparatus connects to the main connection port of a terminal device that is not connecting to the plurality of connection ports provided by the signal exchange unit of the first exchange apparatus, and the second exchanger of the second exchange apparatus connects to the backup connection port of a terminal device that is not connecting to the plurality of connection ports provided by the signal exchange unit of the second exchange apparatus; the third exchanger of the first exchange apparatus is connecting with the first exchanger and the second exchanger of the first exchange apparatus, and the third exchanger also connects with the connection unit of the first exchange apparatus, wherein, the first exchange apparatus detects whether the first exchanger and the second exchanger connect to the connection ports of the terminal devices, and based on the detected result correspondingly switches the data transmission path of the first exchanger of the first exchange apparatus and the second exchanger of the first exchange apparatus to either internal local area network or external network architecture; and the third exchanger of the second exchange apparatus is connecting with the first exchanger of the second exchange apparatus and the second exchanger of the second exchange apparatus, and the third exchanger also connects with the connection unit of the second exchange apparatus, wherein the second exchange apparatus detects whether the first exchanger and the second exchanger connect to the connection ports of the terminal devices, and based on the detected result correspondingly switches the data transmission path of the first exchanger of the second exchange apparatus and the second exchanger of the second exchange apparatus to either internal local area network or external network architecture.

Compared with the prior art, the expandable exchange apparatus and its backup system according to the present invention provides the prior switch, which has only eleven connection ports for internal connection, with the capability that allows twelve terminal devices to execute data transmission via 10 Gb Ethernet. Furthermore, the backup system of the expandable exchange apparatus according to the present invention connect with each other via the network architecture and connect to the terminal devices that has main and backup connection ports, at the time that one of the expandable exchange apparatuses has a breakdown, the backup system switches to the normal operation expandable exchange apparatus timely, thereby, reducing the interruption of the connection between the terminal devices and the network architecture caused by the breakdown of the expandable exchange apparatus. In addition, the expandable exchange apparatus and its backup system according to the present invention provides the application flexibility of external network connection for the plurality of terminal devices, but not limited to the number of connection ports provided by the network exchanger, therefore, the expandable exchange apparatus and its backup system according to the present invention increase the product value of blade server and its transmission power via external network.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
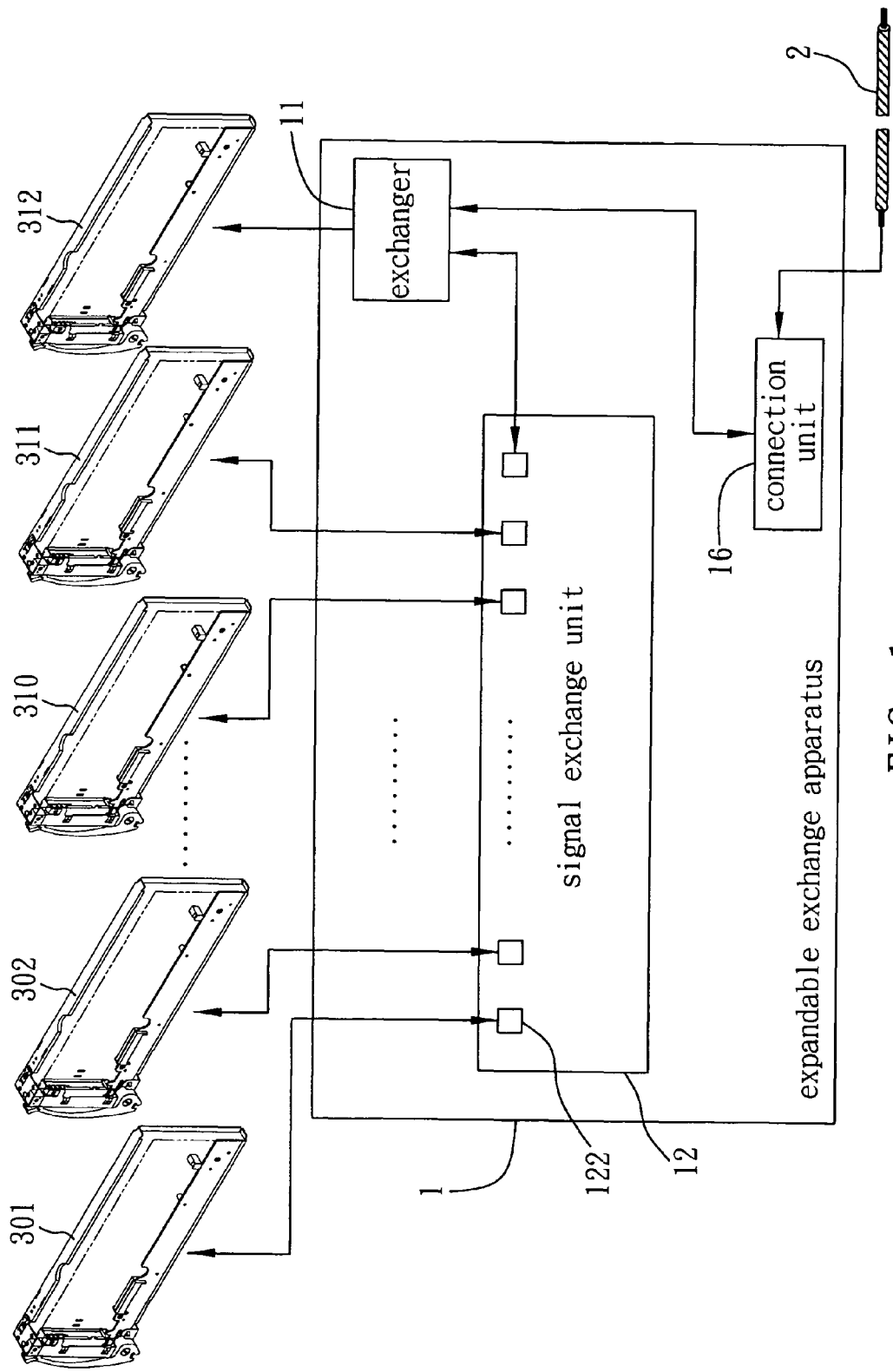
FIG. 1 is an application architecture diagram of an expandable exchange apparatus according to the present invention.

Please refer to FIG. 1, which is an application architecture diagram of an expandable exchange apparatus 1 according to the present invention. The expandable exchange apparatus 1 of the present invention is applicable to a network architecture 2 that consists of a plurality of terminal devices 301~312. In the present embodiment, the network architecture 2 is a local area network (LAN) under Ethernet architecture, which provides a plurality of terminal devices 301~302 through the expandable exchange apparatus 1 of the present invention with the capability of interconnections and/or traffic transmission with terminal devices of far end. In the present embodiment, the traffic is in terms of the messages sent by the server or received from other server and/or far end terminal device, wherein, the terminal devices 301~312 are, e.g. blade servers.

The expandable exchange apparatus 1 comprises an exchanger 11, a signal exchange unit 12, and a connection unit 16.

The signal exchange unit 12 is, e.g. a processor chip of a 10 Gb Ethernet switch (or switch hub), which provides the terminal devices 301~312 in the local area network with the capability of exchanging data with one another. The signal exchange unit 12 has twelve connection ports 122, eleven of which (terminal connection ports) are connected with the terminal devices 301~311, and the remaining one of which (network connection port) serves as a connection port for an external connection. Since the connection port 122 that is for the external connection is connecting with the exchanger 11 that is also connecting with the terminal device 312, therefore, selectively the twelve terminal devices 301~312 can become an internal network via the signal exchange unit 12 or become capable of connecting with an external network architecture 2 via the connection port 122 that is for the external connection.

Figure 2:
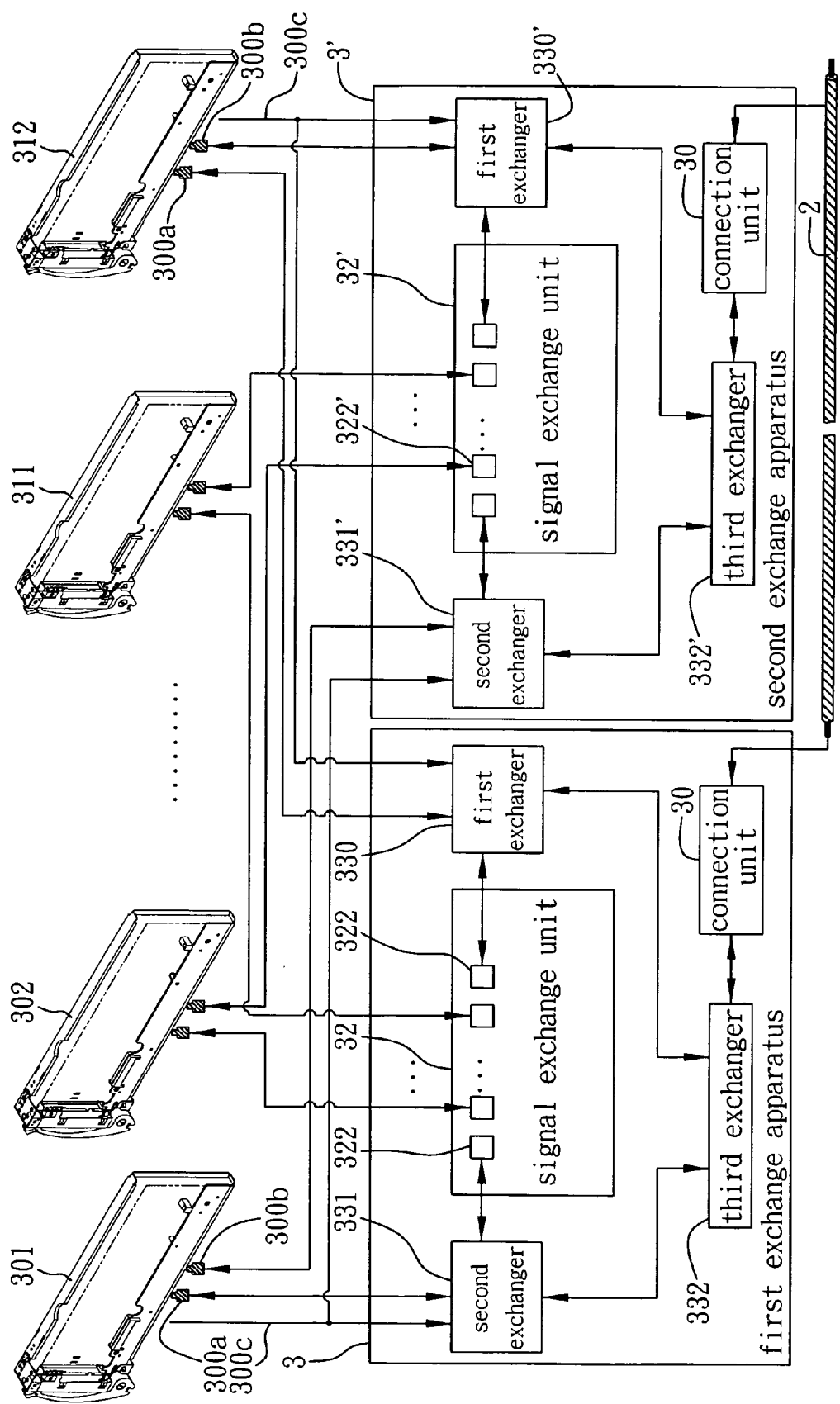
FIG. 2 is an application architecture diagram of a backup system of the expandable exchange apparatus shown in FIG. 1.

Based on the current traffic through network connection ports 122, the signal exchange unit 12 first judges the transmission demand of the terminal devices 301~312 connected to the connection ports 122 and then executes the internal or external data transmission. In the present embodiment, the signal exchange unit 12 has twelve connection ports 122, one of the twelve connection ports 122 serves as an external connection port 122 and connects with the exchanger 11, and the exchanger 11 separately connects with terminal device 312 and connection unit 16 that is connecting with network architecture 2, therefore, therefore, through the exchanger 11 that is connecting with the network architecture 2, the signal exchange unit 12 provides the twelve terminal devices 301~312 with the capability to use 10 Gb Ethernet to execute transmission; therefore, the expandable exchange apparatus 1 according to the present invention provides the only eleven internal connection ports 122 with the capability of supplying twelve terminal devices 301~312 to use 10 Gb Ethernet to execute transmission Please refer to FIG. 2, which is an application architecture diagram of the backup system of the expandable exchange apparatus 1 according to the present invention. The backup system comprises a first exchange apparatus 3 and a second exchange apparatus 3', and the first exchange apparatus 3 and the second exchange apparatus 3' connect with each other via the network architecture 2, the present embodiment provides a network exchange apparatus backup mechanism that prevents the internal or external network data transmission processing of the terminal devices from being affected by the breakdown of a single expandable exchange apparatus, in the present embodiment, in addition to the original elements in FIG. 1, additionally there are a second exchanger (331, 331') and a third exchanger (332, 332'), and the connection pattern between the terminal devices 301~312 with the first and the second exchange apparatuses (3,3') is different from that in FIG. 1, otherwise the rest operational relation is the same as in FIG. 1, therefore there is no need of repeated description herein.

Each of the terminal devices 301~312 has a main connection port 300a and a corresponding backup connection port 300b, as in the present embodiment, the connection ports (300a, 300b) are the connection ports of 10 Gb Ethernet, and each of the terminal devices 302~311 individually and directly connects at its own connection ports (300a, 300b) to the connection ports (322, 322') of the first and the second exchange apparatuses (3, 3'), only the terminal device 301 and terminal device 312 individually but indirectly connect at its own connection port (300a, 300b) to the connection ports (322, 322') of the first and the second exchange apparatuses (3,3'), wherein, each of the terminal device 301 and terminal device 312 has its own notice signal line 300c that notifies the first and the second exchange apparatuses (3, 3') whether it is connecting to the exchange apparatus or not, in other words, when the main connection port 300a or backup connection port 300b of the two terminal devices, terminal device 301 and the terminal device 312, connects with the first exchange apparatus 3 or the second exchange apparatus 3', the notice signal line 300c of the terminal device 301 or the terminal device 312 sends a signal to the first exchange apparatus 3 or the second exchange apparatus 3', and then the first exchange apparatus 3 or the second exchange apparatus 3' gets to know whether it is connecting with the terminal device (301 or 312) or not, meanwhile, set the first exchange apparatus 3 or the second exchange apparatus 3' as a main exchange apparatus or a backup exchange apparatus, as in the present embodiment, the main connection ports 300a of both the terminal device 301 and the terminal device 312 are connecting with the first exchange apparatus 3, the first exchange apparatus 3 serves as the main exchange apparatus; and the backup connection ports 300b of both the terminal device 301 and the terminal device 312 are connecting with the second exchange apparatus 3', therefore, the second exchange apparatus 3' serves as the backup exchange apparatus.

Generally, each of the terminal devices 301~312 has only a main connection port 300a that provides each of the terminal devices 301~312 for connection purpose with the first exchange apparatus 3, at the time that the first exchange apparatus 3 has a breakdown, the second exchange apparatus 3' that is connecting with the backup connection ports 300b takes charge of the tasks of the first exchange apparatus 3 and fulfills its backup purpose.

Wherein, it is by the means of the notice signal lines of both the terminal device 301 and the terminal device 312 to notify the first or the second exchange apparatus (3 or 3') that is capable of normal operation to execute the switch tasks and then take over the jobs of the exchange apparatus that has a breakdown, as in the present embodiment, it is the notice signal line 300c of the terminal device 312 that connects with the first exchangers (330, 330') to timely switch the tasks of the main and the backup exchange apparatuses (3, 3').

Furthermore, under the situation that the connection relation between the first exchangers (330, 330'), the second exchangers (331, 331'), and the third exchangers (332, 332') as well as the first and the second exchange apparatuses (3, 3') are at normal state, if the terminal device 312 is unset, namely, the terminal device 312 is not connecting with either the first exchange apparatus 3 or the second exchange apparatus 3', the terminal device 301 can directly switch to the external network architecture 2 by using its own connection ports (300a or 300b) via the second exchanger (331, 331') and the third exchanger (332, 332'), it does not require the first exchanger (330, 330') to notify the third exchanger (332, 332') to execute the transmission path switch operation, therefore, the terminal device 301 can directly use the 10 Gb Ethernet via the second exchanger (331, 331') and the third exchanger (332, 332'). The switch mode is that the second exchangers (331, 331') and the third exchangers (332, 332') execute the switching tasks based on the signals sent by the notice signal line 300c of the terminal device 312 that is connecting with the first exchangers (330, 330').

In the present embodiment, the first exchange apparatus 3 and the second exchange apparatus 3' connect with each other via the network architecture 2, and also connect with the terminal devices 301~312 that each consists of a main and a backup connection ports (300a, 300b), provide the terminal devices 301~312 with the capability to switch to the normal operation exchange apparatus at the time that the first or the second exchange apparatus (3 or 3') has a breakdown, thereby, reducing the interruption of connection between the terminal devices 301~312 and the network architecture 2 caused by the breakdown of the first or the second exchange apparatus (3 or 3').

Furthermore, in the present embodiment, the first and the second exchange apparatuses (3, 3') provide the plurality of the terminal devices with the application flexibility of external network connection, especially when applied in blade servers, it does not need to match with the current 10 Gb Ethernet exchanger that provides twelve connection ports and can allow only eleven of the twelve blade server units (namely, the terminal devices) of a blade server to use external network, therefore, the expandable exchange apparatus and its backup system according to the present invention increases, the products value of, e.g. blade server, and its external network connection transmission power.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A backup system of an expandable exchange apparatus, which is applicable to a plurality of terminal devices in a LAN, each of the terminal devices having a main connection port and a backup connection port, the backup system comprising:

a first exchange apparatus, which serves as a main exchange apparatus and comprises a signal exchange unit, a connection unit, a first exchanger, a second exchanger, and a third exchanger, the signal exchange unit having a network connection port for the LAN to make external connection, an exchange port connected to the second exchanger, and a plurality of terminal connection ports connected to the main connection ports of the terminal devices, the connection unit being for the LAN to externally connect with a network architecture, the first exchanger being connected to a main connection port of an additional terminal device that is connected to none of the network connection port, exchange port and terminal connections of the signal exchange unit of the first exchange apparatus;

a second exchange apparatus, which serves as a backup exchange apparatus and comprises a signal exchange unit, a connection unit, a first exchanger, a second exchanger, and a third exchanger, the signal exchange unit of the second exchange apparatus comprising a network connection ports for the LAN to make external connection, an exchange connection port connected to the second exchanger of the second exchange apparatus, and a plurality of terminal connection ports connected to the backup connection ports of terminal devices, the connection unit being for the LAN to externally connect with a network architecture, the first exchanger being connected to a backup connection port of the additional terminal device that is connected to none of the network connection port, exchange port and terminal connections of the signal exchange unit of the second exchange apparatus;

wherein the second exchanger of the first exchange apparatus connects with the main connection port of a terminal device that is not connecting with the plurality of connection ports of the signal exchange unit of the first exchange apparatus, and the second exchanger of the second exchange apparatus connects with the backup connection port of a terminal device that is not connecting with the plurality of connection ports of the signal exchange unit of the second exchange apparatus; and the third exchanger of the first exchange apparatus connects with the first exchanger of the first exchange apparatus and the second exchanger of the first exchange apparatus, and the third exchanger also connects with the connection unit of the first exchange apparatus, wherein the first exchange apparatus detects whether the first exchanger and the second exchanger connect with the connection ports of terminal devices or not, and based on the detected result, correspondingly switches the data transmission path of the first exchanger of the first exchange apparatus and the second exchanger of the first exchange apparatus to either internal local area network or external network architecture; and the third exchanger of the second exchange apparatus connects with the first exchanger of the second exchange apparatus and the second exchanger of the second exchange apparatus, and the third exchanger also connects with the connection unit of the second exchange apparatus, wherein the second exchange apparatus detects whether the first exchanger and the second exchanger connect with the connection ports of the terminal device or not, and based on the detected result, correspondingly switches the data transmission path of the first exchanger of the second exchange apparatus and the second exchanger of the second exchange apparatus to either the LAN or the network architecture.

2. The backup system of an expandable exchange apparatus of claim 1, wherein, each of the terminal devices that connect with the first exchangers and the second exchangers of the first exchange apparatus and the second exchange apparatus further comprises a notice signal line, at the time that either the first exchange apparatus or the second exchange apparatus has a breakdown, the notice signal line notifies a normal operation exchange apparatus to take over tasks of an exchange apparatus that has a breakdown, thereby switching jobs of the main and backup exchange apparatuses.

3. The backup system of claim 2, wherein, switching a data transmission path of the terminal device that connects to the second exchangers of the first exchange apparatus and the second exchange apparatus to either an internal local area network or an external network architecture is based on signals sent from a notice signal line of the terminal device that connects with the first exchanger.

4. The backup system of claim 3, wherein, the network architecture is a local area network of Ethernet architecture.

* * * * *